UNITED STATES PATENT OFFICE.

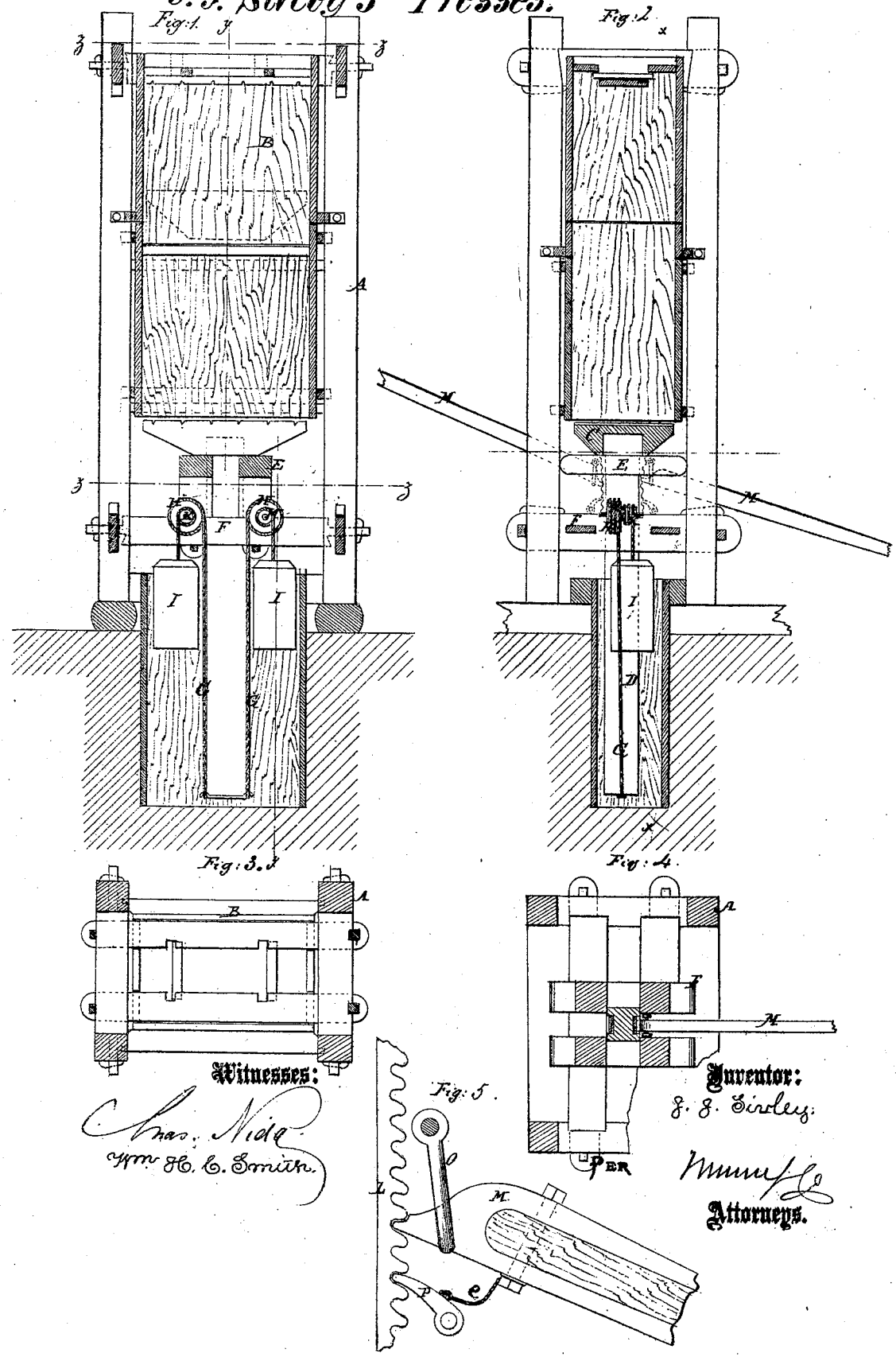

JOHN J. SIVLEY, OF CLARKSVILLE, TEXAS.

IMPROVEMENT IN HAY AND COTTON PRESSES.

Specification forming part of Letters Patent No. 121,133, dated November 21, 1871.

*To all whom it may concern:*

Be it known that I, JOHN J. SIVLEY, of Clarksville, in the county of Red River and State of Texas, have invented a new and useful Improvement in Presses; and I do hereby declare that the following is a full, clear, and exact description thereof, which will enable others skilled in the art to make and use the same, reference being had to the accompanying drawing forming part of this specification.

My invention consists in the improvement of presses, as hereinafter fully described and subsequently pointed out in the claim.

Figure 1 is a sectional elevation taken on the line $x\ x$, Fig. 2. Fig. 2 is a sectional elevation on the line $y\ y$ of Fig. 1. Fig. 3 is a horizontal section on the line $z\ z$ of Fig. 1. Fig. 4 is a section on the line $z'\ z'$ of Fig. 1, and Fig. 5 is a side elevation of a part of one of the rack-bars, operating-levers, and one of the holding-pawls.

Similar letters of reference indicate corresponding parts.

A is a strong vertical frame of four posts and suitable cross-pieces or ties, having the case B, into which the cotton or other substance is pressed in the top. C is the follower, having a long wood stem, D, extending into a pit below the base of the frame, passing between the guides E F, suitably arranged for maintaining it in a vertical position while allowing it to work up and down. This stem is connected at the lower end to ropes G, which rise up to and wind over the drums H, having the counter-weights I suspended on cords working over the reduced portions K of the said drums. These weights are intended to counterbalance the follower, and are suspended from the small part of the drum, so that the follower may be raised sufficiently high while they move to the bottom of the pit. The stem D is provided with the toothed rack-bars L, one on each side of two opposite sides, and a lever, M, is provided for each, said levers being suspended in yokes O, which admit of their being moved toward and from the bars for the point to pass the teeth of said bars when moving from one to another in operation. P is a holding-pawl, pivoted on any firm base, one in front of each toothed rack, to fall into the notches and hold the follower up when the levers let go for a new hold. Each pawl is connected to its lever by a chain or cord, Q, of suitable length to draw it out of the notches when the lever is pulled back to let the follower down.

Of course, the machine may be worked by one lever and rack-bar only; but it is preferred to employ two.

In the ordinary operation of levers M the pawl P is not elevated, but only when the said lever is withdrawn or raised in a vertical position purposely to allow the rack L to descend.

Having thus described my invention, I claim as new and desire to secure by Letters Patent—

In combination with a racked-follower, C L, and lever M, a pawl, P, when connected with said lever by a cord, Q, as and for the purpose specified.

JOHN J. SIVLEY.

Witnesses:
JOHN L. JAMISON,
JOHN A. BAGBY.